(No Model.)

2 Sheets—Sheet 1.

S. EVERSHED.
ELECTRIC MEASURING APPARATUS FOR ALTERNATE CURRENTS.

No. 503,589.  Patented Aug. 22, 1893.

Witnesses:
E. K. Sturtevant
A. R. Wandell

Inventor:
Sydney Evershed
by Richards & R.
atys

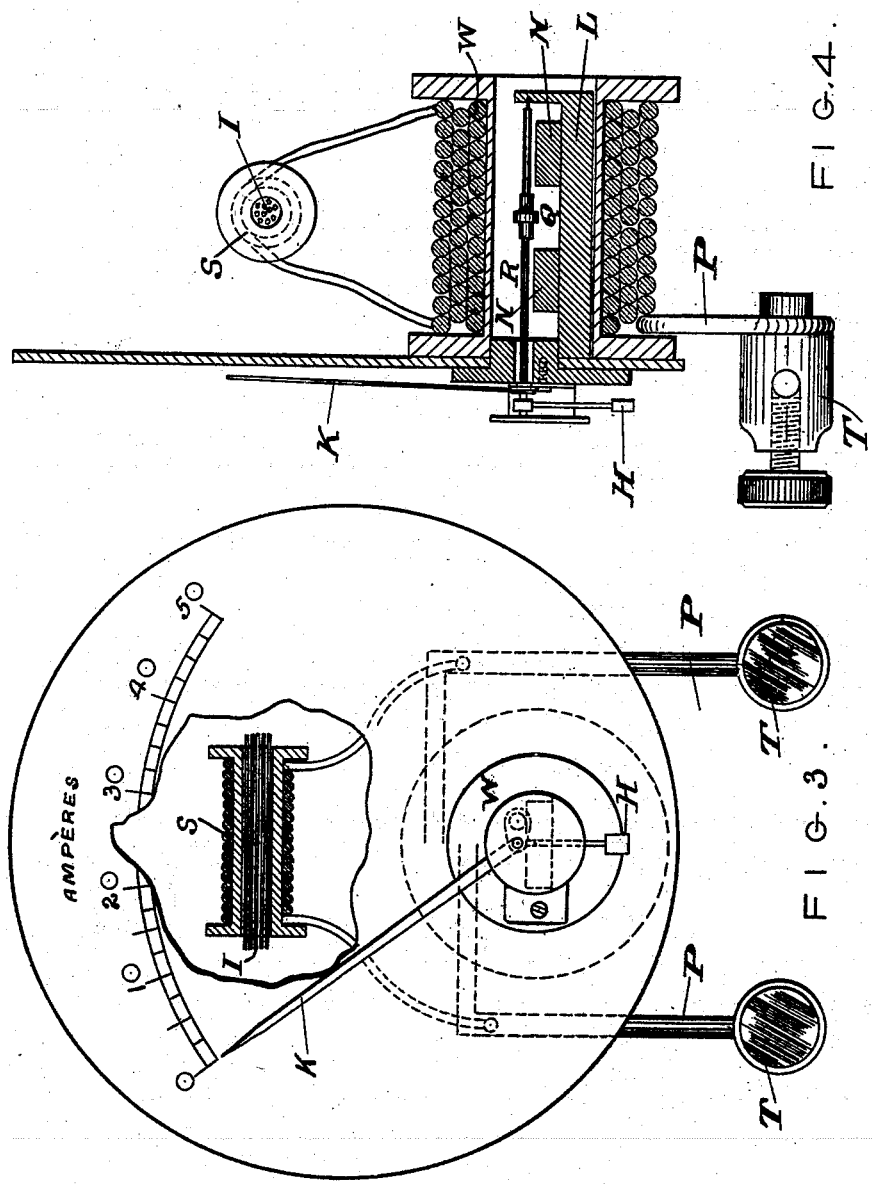

United States Patent Office.

SYDNEY EVERSHED, OF LONDON, ENGLAND.

ELECTRIC MEASURING APPARATUS FOR ALTERNATE CURRENTS.

SPECIFICATION forming part of Letters Patent No. 503,589, dated August 22, 1893.

Application filed December 22, 1891. Serial No. 415,925. (No model.) Patented in England November 1, 1889, No. 17,317.

*To all whom it may concern:*

Be it known that I, SYDNEY EVERSHED, residing at London, England, have invented an Improvement in Electric-Measuring Apparatus for use with Alternate Currents, (for which I have received Letters Patent in Great Britain and Ireland, No. 17,317, dated November 1, 1889,) of which the following is a specification.

My invention relates to an improvement in electro magnetic measuring instruments and integrating meters whereby they are rendered suitable for the accurate measurement of alternate currents by the correction on the indicating circuit of an induced current. It is well known that an electro-magnetic voltmeter for example calibrated so that it reads correctly on a direct current circuit, does not indicate correctly either the mean or the effective potential difference or pressure when used on an alternate current circuit, the error when so employed is due chiefly to the impedence of the working coil, eddy currents in the metal portions of the instrument, and effects of hysteresis, when iron or other magnetic substance is employed. In an ammeter the error is due to eddy currents, hysteresis, &c., but the impedence of the working coil does not usually affect the indications of the instrument. Watt meters and integrating meters are affected by similar errors, and in addition there is usually an error in watt meters and integrating meters due to the current in the pressure coil not being co-phasal with the potential difference at its terminals; and occasionally, to the current in the current coil not being cophasal with the main current. These errors may be almost entirely eliminated according to my invention by the following arrangement.

Figure 1:
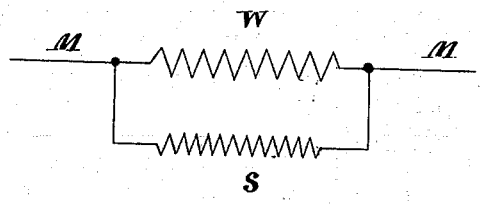
Figure 2:
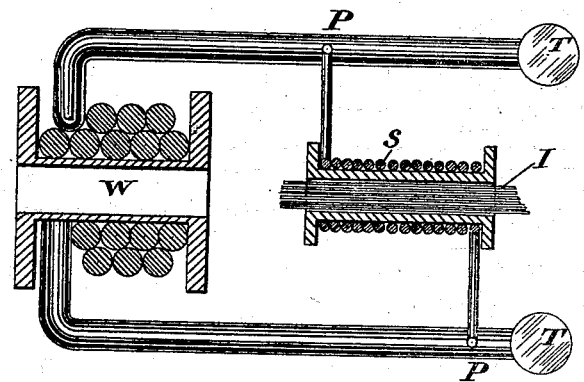

Figure 1 shows an arrangement diagrammatically of an induced or shunt circuit combined with the working coil of any measuring instrument. Fig. 2 is a sectional detail of the inductive shunt coil and the working coil of a measuring instrument. Fig. 3, is a broken face view of my complete measuring instrument for alternating currents. Fig. 4, is a transverse section through the same to show an example of a known means for the indication of the strength of the alternating current.

The working coil of a measuring instrument may be combined with an idle induced or shunt coil of large impedence, so that the portion of current diverted from the working coil diminishes as the period frequency of the current increases, and when a suitable value is given to the impedence of the shunt coil, the indications of the instrument will be very nearly the same for alternate as for direct currents, and consequently nearly independent of the frequency. Fig. 1 of the diagrams attached to this specification illustrates this method: M M. is the main, carrying the current to be measured. W is the working coil, and S the inductive shunt coil, which is so arranged as to have no direct magnetic effect on the working coil or on the mechanism of the instrument.

Fig. 2 shows one method of making an inductive shunt coil and attaching it to the working coil of a measuring instrument of any convenient construction. The working coil is shown in section at W, and the winding is brought out to the terminals of the instrument T T; the shunt coil is made by choosing a wire of such sectional area, that when about five per cent. of the whole current is passed through it, the current density will be about the same as that in the working coil; in other words the area of the shunt wire is about one-twentieth that of the working wire. A sufficient length of shunt wire is taken so that when its ends are soldered to the working wire at the points P P, about one-twentieth of the whole current is shunted, and does not pass through W. The whole length of the shunt wire is formed into a coil of as many turns as it will make, consistently with leaving a central hole large enough to enable the iron wire I to be readily placed within or about the coil. Before placing the iron wire within or about the coil, the measuring instrument may be calibrated by means of direct-currents, and then place it in an alternate current circuit, in series with a standard alternate current measuring instrument; small iron wire (about one millimeter diameter is a convenient size) is placed within or about the shunt coil, thus increasing its inductive effect and choking off by impedence some of the shunted alternating current. The reading of the instrument is watched, and when it agrees with the standard instrument, sufficient iron wire has been wound on, and the whole coil tightly bound with tape to keep the iron wire in place.

No exact rule can be stated giving the size of the shunt coil and number of turns of iron wire, but provided the above instruction for choosing an appropriate size of wire for the shunt is carried out, and the wire coiled up so as to make as large a number of turns as possible, we find there will usually be required from twenty to sixty turns of iron wire, of about one millimeter diameter. Of course this proportion depends largely on the special form of measuring instrument to be corrected, and on the quality of the iron and the exact proportions of the shunt coil and its iron wires can only be determined in each case by experiment. This method is applicable to ammeters, measuring instruments, the current coils of watt meters, &c., and can also be applied to a volt meter.

Within the working coil W, is placed any known indicating mechanism and pointer to show the strength of the passing alternating current. As an example R, is a spindle pivotally mounted within the axis of the working coil W, and is provided with a crank arm Q, of soft iron and a balance or controlling weight H, keeping the pointer K, at zero when the current is not passing. Two blocks of soft iron N, are inserted as pole pieces to one side of the core of the working coil. When the current passes through the coil the crank arm Q, is drawn down into the magnetic field of greatest intensity against the re-action of the controlling weight H, and the strength of the current is thus indicated. There are many equivalent forms of such indicating mechanisms in daily use. This indicating mechanism is similar to that shown by me in my Patent No. 478,097 the application for which was filed December 18, 1891.

In this specification the phrase "reading correctly" signifies that the instrument or apparatus gives the same indications with a direct current as it does with an alternate current of usual commercial frequency of the same effective value as the direct current and it has been assumed that the instruments to which my invention is to be applied are to be made to indicate the effective current or pressure and the true power or work, but ammeters and voltmeters can be made to read the mean value of the current and pressure by adopting one of the methods above described and determining the proportions of the various coil resistances, &c., by experiment.

Having now described my invention, what I claim is—

1. In any electro-magnetic apparatus for the measurement of electric pressure, power or work, in an alternating current, the combination with the working coil of the said apparatus of a shunt impedence coil, about the said working coil, to produce an effect on the measuring instrument compensating for the errors due to an alternating current.

2. In any electro magnetic apparatus for the measurement of electric pressure, power or work, in any alternating current circuit, a shunt circuit about the working coil of about one-twentieth the area of the coil circuit, inductive iron wire in or about a coil of the said shunt circuit, in combination with the usual operating coil furnished with means for indicating the value of the passing current, substantially as described.

In testimony whereof I have signed my name to this specification in the presence of two subscribing witnesses.

SYDNEY EVERSHED.

Witnesses:
REGINALD W. JAMES,
RICHARD A. HOFFMANN.